United States Patent [19]

Otty

[11] Patent Number: 4,558,580
[45] Date of Patent: Dec. 17, 1985

[54] COIL SHAPING APPARATUS

[76] Inventor: Malcolm Otty, Westering, Mill Hay Rd., Caldy, Merseyside, England

[21] Appl. No.: 622,152

[22] Filed: Jun. 19, 1984

Related U.S. Application Data

[63] Continuation of Ser. No. 281,676, Jul. 9, 1981, abandoned.

[30] Foreign Application Priority Data

Jul. 9, 1980 [GB] United Kingdom ................ 8022522

[51] Int. Cl.[4] ............................................. B21D 11/00
[52] U.S. Cl. ........................................ 72/301; 72/298; 29/596
[58] Field of Search ................. 72/301, 298, 295, 303, 72/305, 311, 387; 29/596, 605

[56] References Cited

U.S. PATENT DOCUMENTS

| | | | |
|---|---|---|---|
| 1,435,284 | 11/1922 | Fathauer | 72/295 |
| 1,495,959 | 5/1924 | Mavity | 72/295 |
| 1,566,227 | 12/1925 | Pleasant | 72/301 |
| 2,451,222 | 10/1948 | James | 72/295 |
| 2,506,219 | 5/1950 | James | 269/25 |
| 2,841,200 | 7/1958 | James | 72/298 |
| 2,962,076 | 11/1960 | Durham | 72/298 |
| 3,004,584 | 10/1961 | Fuchs et al. | 72/298 |
| 3,241,347 | 3/1966 | Seeloff | 72/301 |
| 3,452,786 | 7/1969 | Lund et al. | 29/596 |

Primary Examiner—Daniel C. Crane
Attorney, Agent, or Firm—Oblon, Fisher, Spivak, McClelland & Maier

[57] ABSTRACT

A shaper for the coils of large rotary electric machines bends an elongate loop coil blank so that the inwardly-directed faces (15) of the straight parallel sections are turned downwardly so that the ends (14) of the coil "kink" downwardly, thereby making possible a downwardly directed mallet blow for initiating kinking of the ends 14 in the correct direction.

7 Claims, 6 Drawing Figures

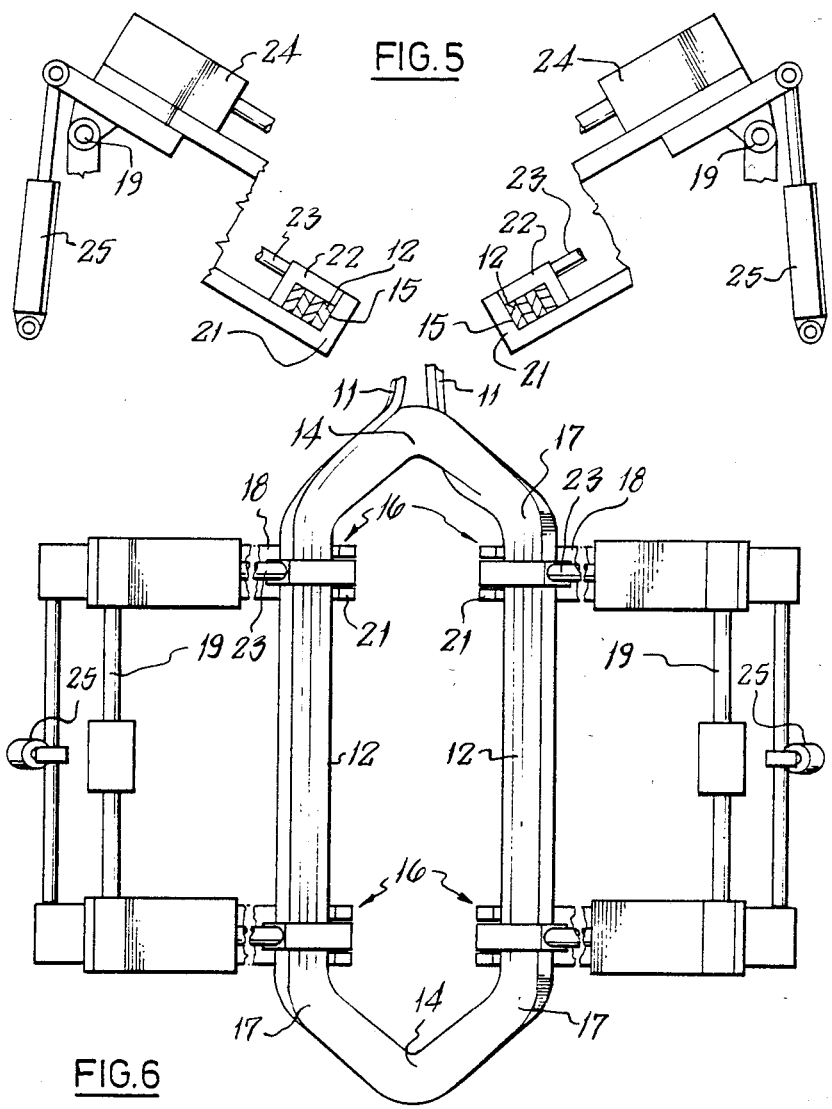

COIL SHAPING APPARATUS

This is a continuation of application Ser. No. 281,676, filed July 9, 1981, now abandoned.

This invention relates to coil shaping apparatus for shaping the coils for larger rotary electric machines. Such coils comprise loops of conductor, usually copper, having a generally rectangular cross section that will be a snug fit in a rotor or stator slot. The loops are of a generally rectangular shape with two straight parallel sections that fit into angularly spaced apart rotor or stator slots, connected by end sections. The straight, parallel sections will have their faces relatively inclined to fit the two angularly spaced apart slots, which are usually cut radially.

Such coils are made from rectangular cross-section copper strip by winding an elongate loop of several turns of strip and binding together the turns of the loop so as to form a laminated conductor of generally rectangular cross-section. This loop, which is so narrow in relation to its width that the two parallel straight sections may be touching or practically so, is then pulled out in width on a shaper that brings it to the final shape required to fit the rotor or stator slots. The shaper not only pulls out the straight sections—it also twists the one relatively to the other about its lengthwise axis to fit the angularly separated slots. As a result of this relative twisting, a characteristic "kink" appears in each end of the coil.

A coil shaper comprises a set of four grippers, one for each corner of the coil, initially situated so that the elongate loop can be placed in them. The grippers are pneumatically, hydraulically or otherwise separable and twistable so as to bring the loop into the coil shape required. The shaper is usually adapted to produce different sizes and shapes of coil by adjustment of its parts as required so that once an elongate loop is in position and the "go" button pressed, the operation is automatic.

However, in order to ensure that the "kinks" go the right way, it is necessary to start the kinking with a mallet blow at each end of the coil.

Conventionally, the coil is held substantially horizontally throughout the shaping operation. Hitherto, shapers have been so constructed and arranged that the twisting turns the inwardly-directed faces of the parallel straight sections upwardly, so that the ends of the coil "kink" upwardly out of the plane containing the straight sections. The mallet blow is therefore made in an upward direction from beneath the coil.

We have now found, however, that it is possible to arrange the shaper so that the inwardly-directed faces of the parallel straight sections are turned downwardly, so that the ends of the coil "kink" downwardly below the plane containing the straight sections, and that this leads to easier operation of the shaper because the mallet blow is now brought downwardly from above the coil, and this involves a more natural action.

The invention comprises a shaper for coils for larger electrical machines comprising grippers for the corners of the coil and powered means moving the grippers apart from an initial position for insertion of an elongated loop coil blank to a final position in which the coil is shaped and the grippers rotated so as to turn the inwardly-directed faces of the straight parallel sections thereof downwardly so that the ends of the coil will "kink" downwardly below the plane containing the straight sections.

The grippers may be carried on arms pivoted on parallel axes so that downward pivoting of the arms both moves the grippers apart and rotates them. The lengths of the said arms and the positions of the said axes may be adjustable.

Said grippers may comprise claw members fixed at the ends of said arms and co-operating, fluid pressure actuated clamping members. Said clamping members may be carried on pistons of pneumatic or hydraulic rams mounted on said arms.

Said arms may be pivoted pneumatically or hydraulically by piston-in-cylinder arrangements acting on the sides of the axes remote from the grippers.

There are preferably two arms on each of the said axes, so that there are four grippers altogether, the separation of the grippers on each of the axes being adjustable.

One embodiment of a coil shaper according to the present invention will now be described according to the accompanying drawings, in which:

FIG. 5 is an end elevation like FIG. 3 but with the shaper in its final position, and FIG. 6 is a plan view like FIG. 4 showing the shaper in the position of FIG. 5.

Figure 1:
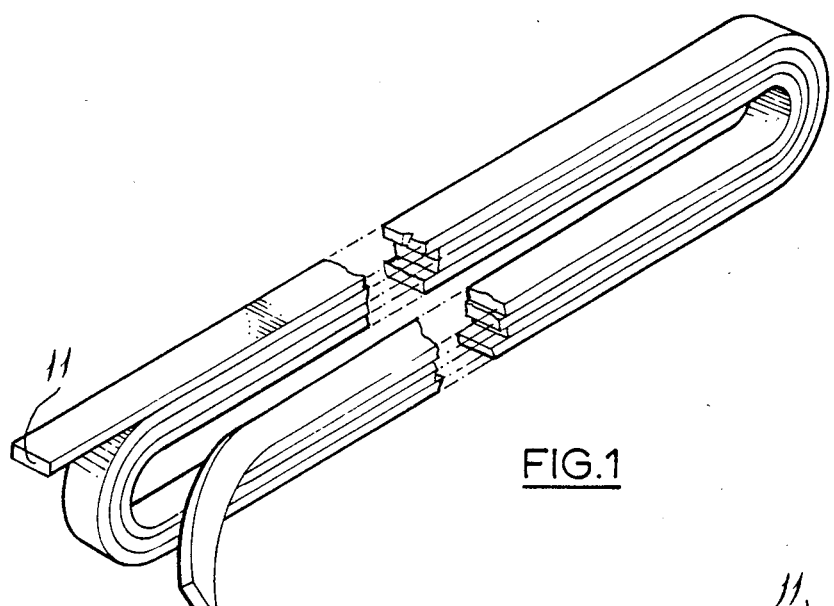
FIG. 1 shows an elongate loop coil blank.
Figure 2:
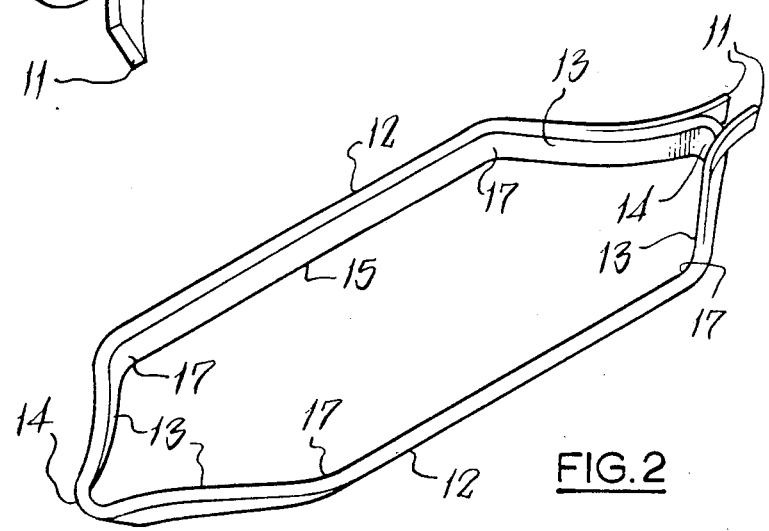
FIG. 2 shows a shaped coil.

The elongate loop coil blank illustrated in FIG. 1 consists of a simple winding of insulated copper of rectangular cross section, the ends 11 of the copper terminating at the same end of the coil. The winding consists of four turns. It is required to bring this blank into the shape shown in FIG. 2 in order to fit into the slots of the rotor or stator of an electric machine. FIG. 2 shows a typical coil for a larger electric motor or generator comprising a loop of generally rectangular shape with two straight, parallel sections 12, that fit into angularly spaced apart rotor or stator slots, connected by end sections 13. Actually, the end sections 13 are not straight, nor are they connected to the straight parallel sections 12 at well defined "corners". The end sections 13 may sometimes depart so far from straightness that it would be better to describe the coil as substantially hexagonal. Nevertheless, the essence of the coil is that it has the straight parallel sections 12 connected by end sections 13. The parallel sections 12 have, however, been twisted relative to one another about their longitudinal axes so as to fit into the angularly separated slots, which are usually cut radially. This twisting introduces a "kink" 14 into each end section 13, so that the end sections 13 actually project out of the plane containing the straight sections 12.

It is required that the "kink" 14 be on the same side of the plane referred to as the perpendiculars projecting from the inner faces 15 of the sections 12. Left to itself, the end sections 13 might bend either way during the shaping operation. It is necessary to ensure kinking in the correct sense by a tap with a mallet at the appropriate moment during the operation—this step could of course be automated, but since the coil must be loaded and removed manually, and the shaping operation supervised, the practice is for the mallet strokes to be made by the machine operator.

FIGS. 3 to 6 illustrate a shaping machine for bringing the blank 11 of FIG. 1 into the shape shown in FIG. 2. The machine comprises grippers 16 for the "corners" 17 of the coil (see also FIG. 2) and powered means moving the grippers 16 from an initial position (shown in FIGS. 3 and 4) for insertion of the blank 11 to a final position (shown in FIGS. 5 and 6) in which the coil is shaped and rotating the grippers 16 so as to turn the inwardly-directed faces 15 of the straight parallel sections 12 thereof downwardly, so that the ends 13 of the coil will "kink" downwardly below the plane containing the sections 12.

Figure 3:
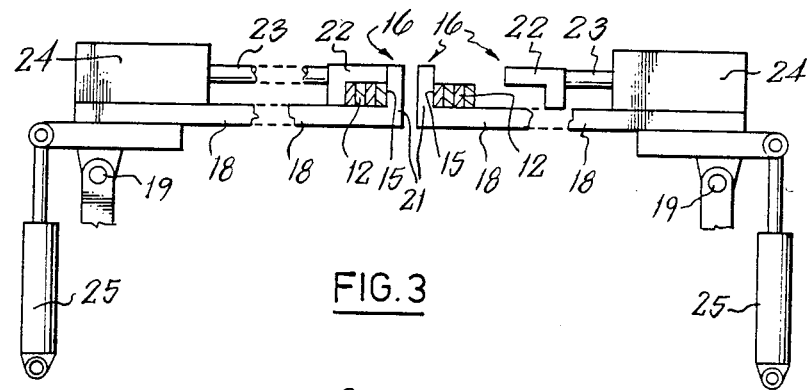
FIG. 3 is an end elevation of a coil shaper in its initial position with a blank in place.
Figure 4:
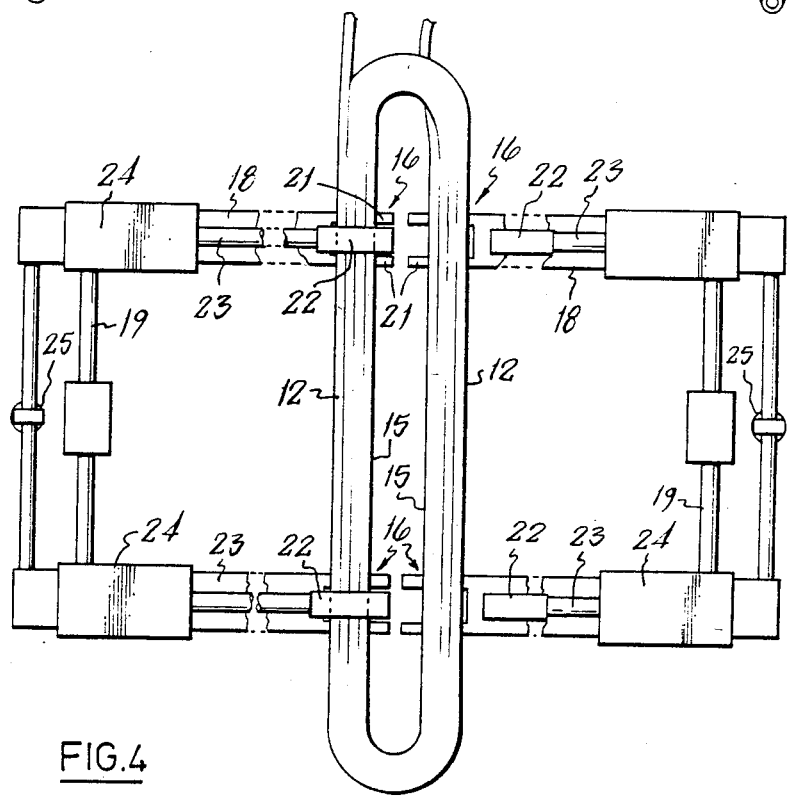
FIG. 4 is a plan view of the arrangement shown in FIG. 3.

The grippers 16 are carried on arms 18 pivoted on parallel axes 19 so that downward pivoting of the arms 18 both moves the grippers 16 apart and rotates them—because they are fixed with regard to the arms 18 and the arms themselves rotate. The lengths of the arms 18 and the positions of the axes 19 are adjustable (by means not shown) so that it is always possible to select a combination of length and spacing to achieve the desired spreading and the desired relative inclination of the sections 12 by a simple pivoting motion of the arms 18. The arms 18 will usually be quite long to achieve the necessary spreading while only twisting the sections 12 relatively to one another by a small angle, say about 60°. The drawings are compressed, indicating this length by dashed lines. The grippers 16 comprise claw members 21 fixed at the ends of the arms 18 and fluid-pressure actuated clamping members 22. The members 22 are carried on pistons 23 of pneumatic or hydraulic rams 24 mounted on the arms 22. In FIG. 3, the right hand clamping member 22 is shown in the retracted position for loading the blank—the left hand clamping member 22 is shown clamping the blank against the claw member 21. In practice the clamping members 22 will all be moved simultaneously after loading the blank in the claw members 21.

The arms 18 are pivoted about the axes 19 pneumatically or hydraulically by piston-in-cylinder arrangements 25 acting on the sides of the axes 19 remote from the grippers 16.

There are two arms 18 on each of the axes 19 so that there are four grippers 16 altogether—one for each "corner" 17. The separation of the grippers along the axes 19 is adjustable (again by means not shown) to suit different sizes of coil.

The downward bending of the blank has the advantage over prior art arrangements that it enables the operator of the shaping machine to bring his mallet blow downwardly on the ends of the coil, which will then, as desired, turn downwardly below whatever level the sides 12 finish up at. Prior art arrangements turn the inwardly directed faces of the coil upwardly, requiring an upward mallet blow from beneath—this is considerably more difficult than a downwardly-directed blow. Moreover, removal of the finished coil from the shaper is considerably facilitated by the present invention as compared with prior art methods.

I claim:

1. A shaper for coils for larger electrical machines, which coils comprise loops of conductor having a generally rectangular cross section and are of a generally rectangular shape with two straight parallel sections defining a plane with inwardly directed faces which face one another, said straight sections being joined by ends of the coil that meet with said straight sections in corners, said shaper comprising:
   grippers for gripping each of said straight parallel sections adjacent the corners of the coil;
   support means for movably supporting the grippers in an initial position for insertion of an elongated loop coil blank and a final position in which the coil is shaped; and
   power means for moving said grippers from said initial position to said final position, wherein said grippers each include a gripping element having a gripping portion engaging said inwardly directed faces of said coils, said gripping portions extending substantially parallel to said inwardly directed faces and to one another when said grippers are in said initial position, each gripper being positioned on said support means such that the support means forms a part of the gripping element, in conjunction with the gripping portion, for engaging the straight section of the coil, the support means which forms a part of the gripping element extends transverse to the gripping portion;
   wherein in said final position said gripping portions are moved downward and rotated from said initial position such that normal lines from said gripping portions intersect one another below said gripping portions,
   whereby said inwardly directed faces are turned downward and said ends of said coil kink downwardly from said plane containing said straight sections.

2. A shaper according to claim 1, wherein said support means comprise arms pivoted on parallel axes so that downward pivoting of the arms both moves the grippers apart and rotates them.

3. A shaper according to claim 2, in which the length of the said arms and the positions of the said axes are adjustable.

4. A shaper according to claim 2, said grippers comprising claw members fixed at the ends of said arms and fluid pressure actuated cooperating clamping members.

5. A shaper according to claim 4, said clamping members being carried on pistons of pneumatic or hydraulic rams mounted on said arms.

6. A shaper according to claim 2 in which said arms are pivoted pneumatically or hydraulically by said means for moving in the form of piston-in-cylinder arrangements acting on the sides of the axes remote from the grippers.

7. A shaper according to any claims 2 to 6, in which there are two arms on each of the axes so that there are four grippers altogether, the separation of the grippers on each of the axes being adjustable.

* * * * *